United States Patent
Take

(10) Patent No.: US 7,495,888 B2
(45) Date of Patent: Feb. 24, 2009

(54) ELECTROLYTIC CAPACITOR

(75) Inventor: Koichiro Take, Oyama (JP)

(73) Assignee: Showa Denko K.K., Tokyo (JP)

( * ) Notice: Subject to any disclaimer, the term of this patent is extended or adjusted under 35 U.S.C. 154(b) by 213 days.

(21) Appl. No.: 10/577,324

(22) PCT Filed: Oct. 28, 2004

(86) PCT No.: PCT/JP2004/016385

§ 371 (c)(1), (2), (4) Date: Apr. 28, 2006

(87) PCT Pub. No.: WO2005/041226

PCT Pub. Date: Jun. 5, 2005

(65) Prior Publication Data

US 2007/0127190 A1    Jun. 7, 2007

Related U.S. Application Data

(60) Provisional application No. 60/516,834, filed on Nov. 4, 2003, provisional application No. 60/516,766, filed on Nov. 4, 2003.

(30) Foreign Application Priority Data

| Oct. 29, 2003 | (JP) | 2003-369034 |
| Oct. 29, 2003 | (JP) | 2003-369036 |
| Dec. 24, 2003 | (JP) | 2003-426354 |
| Dec. 24, 2003 | (JP) | 2003-426356 |

(51) Int. Cl.
*H01G 2/10* (2006.01)
*H01G 9/08* (2006.01)

(52) U.S. Cl. .................. 361/517; 361/535

(58) Field of Classification Search ........... 361/503, 361/516–521, 523, 535–539
See application file for complete search history.

(56) References Cited

FOREIGN PATENT DOCUMENTS

| JP | 156431/1980 | 11/1980 |
| JP | 090828/1985 | 6/1985 |
| JP | 5-243102 | 9/1993 |
| JP | 11-176697 | 7/1999 |
| JP | 11-329899 | 11/1999 |
| JP | 2000-77268 | 3/2000 |
| JP | 2002-15954 | 1/2002 |
| JP | 2002-110479 | 4/2002 |
| WO | 01/76865 | 10/2001 |

*Primary Examiner*—Eric Thomas
(74) *Attorney, Agent, or Firm*—Oblon, Spivak, McClelland, Maier & Neustadt, P.C.

(57) ABSTRACT

In an electrolytic capacitor 1 in which a capacitor element 2 is enclosed in an external casing 3, a heat conductive material 5 having heat conductivity of 1 W/m·K or more is disposed between the external casing 3 and the capacitor element 2 so as to be in contact with them. Alternatively, in an electrolytic capacitor 1 in which a capacitor element 2 is enclosed in an external casing 3 made of aluminum, an external peripheral surface of the external casing 3 is covered with an insulation film 4.

15 Claims, 2 Drawing Sheets

US 7,495,888 B2

ELECTROLYTIC CAPACITOR

This application claims priority to Japanese Patent Application No. P2003-369034 filed on Oct. 29, 2003, Japanese Patent Application No. P2003-369036 filed on Oct. 29, 2003, Japanese Patent Application No. P2003-426354 filed on Dec. 24, 2003, Japanese Patent Application No. P2003-426356 filed on Dec. 24, 2003, U.S. Provisional Application No. 60/516,834 filed on Nov. 4, 2003, and U.S. Provisional Application No. 60/516,766 filed on Nov. 4, 2003, the entire disclosures of which are incorporated herein by reference in their entireties.

CROSS REFERENCE TO RELATED APPLICATIONS

This application is an application filed under 35 U.S.C. §111(a) claiming the benefit pursuant to 35 U.S.C. §119(e)(1) of the filing date of Provisional Application No. 60/516,834 filed on Nov. 4, 2003, and U.S. Provisional Application No. 60/516,766 filed on Nov. 4, 2003, pursuant to 35 U.S.C. §111(b).

BACKGROUND OF THE INVENTION

1. Field of the Invention

The present invention relates to an electrolytic capacitor excellent in heat dissipation performance for use in electronics devices and other devices. In this disclosure, language "Aluminum" denotes aluminum and its alloy.

2. Description of the Related Art

The following description sets forth the inventor's knowledge of related art and problems therein and should not be construed as an admission of knowledge in the prior art.

In most electrolytic capacitors, a capacitor element is accommodated in a cylindrical external casing having a bottom, and electrode terminals are connected to the capacitor element. In such electrolytic capacitors, when ripple current is applied for a long time period or intense current is applied, the capacitor element accommodated therein generates heat. Furthermore, as the size of an electrolytic capacitor increases, the calorific value of the capacitor element further increases. Excessively increased temperature of the capacitor elements due to the heat generation causes deteriorated electrical characteristics of the capacitor such as increased dielectric dissipation factor or decreased capacitance, and also shortens the useful life of the capacitor.

To solve the aforementioned problems, conventionally, an electrolytic capacitor capable of restraining the temperature rise of the capacitor element has been proposed.

For example, an electrolytic capacitor in which metallic collector electrodes are connected to end surfaces of its capacitor element has been proposed (see Japanese Unexamined Laid-open Patent Publication No. P2000-77268 (hereinafter "Patent Document 1"), claim 1). Another electrolytic capacitor also has been proposed. In this electrolytic capacitor, a heat absorbing portion of a heat pipe is disposed in the core portion of the capacitor element, and a heat releasing fin or a heat sink is attached to the heat releasing portion of the heat pipe disposed outside the capacitor (see Japanese Unexamined Laid-open Patent Publication No. H11-329899 (hereinafter "Patent Document 2"), claim 1 and FIG. 1, Japanese Unexamined Laid-open Patent Publication No. H11-176697 (hereinafter "Patent Document 3"), claims 1 and 2, FIG. 1).

In an electrolytic capacitor in which a capacitor element is accommodated in a cylindrical external casing having a bottom, it is also known that silicon oil is filled in a gap between the external casing and the capacitor element to improve the heat dissipation performance (see Japanese Unexamined Laid-open Patent Publication No. P2002-110479 (hereinafter "Patent Document 4"), claim 1).

However, in the aforementioned electrolytic capacitors disclosed in the aforementioned Patent Documents 1 to 3, it is required to manufacture an electrolytic capacitor having a capacitor element and/or an inner structure different from that of a conventional electrolytic capacitor, which results in increased manufacturing cost.

In general, as an external casing, a synthetic resin (polymer) casing or a metallic casing is used (see paragraph number of [0018] of Patent Document 1). However, in cases where the synthetic resin casing is employed, the synthetic resin casing disturbs the heat dissipation because of the poor heat conductivity. On the other hand, in cases where the metallic casing is employed, a synthetic resin sleeve 101 is generally provided outside the metallic casing 100 to establish heat insulation as shown in FIG. 3 (see Patent Document 4). In this case, however, the heat dissipation is also disturbed by the thin air layer (heat insulation layer) formed between the metallic casing 100 and the synthetic resin sleeve 101.

In the electrolytic capacitor disclosed in the aforementioned patent document 4, no change in design of the capacitor element and/or the inner structure is required. In this sense, it is preferable, but the heat dissipation was not satisfactory. Especially, in recent years, as electrolytic capacitors for inverter circuits or AC servomotor driving circuits for use in, e.g., electric automobiles, fuel-cell vehicles, solar energy generation systems or industrial power sources, it has been required to provide an electrolytic capacitor which is excellent in heat dissipation and capable of efficiently radiating heat generated at the time of impressing heavy current or high ripple current. The technique disclosed in the aforementioned patent document 4 could not meet such a demand.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an electrolytic capacitor which is excellent in heat dissipation and capable of manufacturing at low cost.

Among other potential advantages, some embodiments can provide an electrolytic capacitor which is excellent in heat dissipation and capable of efficiently radiating heat generated at the time of impressing heavy current or high ripple current.

According to the present invention, the following means will be provided.

[1] An electrolytic capacitor, comprising:

an external casing;

a capacitor element enclosed in the external casing; and a heat conductive material having heat conductivity of 1 W/m·K or more, wherein the heat conductive material is disposed between the external casing and the capacitor element so as to be in contact with the external casing and the capacitor element.

[2] The electrolytic capacitor as recited in the aforementioned Item [1], wherein the heat conductive material having heat conductivity of 1 W/m·K or more is a heat conductive material in which one or more kinds of particles selected from the group consisting of an alumina particle, an aluminum nitride, a boron nitride particle and a zinc oxide particle are dispersed in a matrix material.

[3] The electrolytic capacitor as recited in the aforementioned Item [1], wherein the heat conductive material having heat conductivity of 1 W/m·K or more is a heat conductive material in which alumina particles are dispersed in a matrix material.

[4] The electrolytic capacitor as recited in the aforementioned Item [2] or [3], wherein an average particle diameter of the particle is 0.5 to 5 μm.

[5] The electrolytic capacitor as recited in the aforementioned Item [2] or [3], wherein a content rate of the particle in the heat conductive material is 70 mass % or more.

[6] The electrolytic capacitor as recited in the aforementioned Item [2] or [3], wherein the matrix material is silicone oil and/or denatured silicone oil.

[7] The electrolytic capacitor as recited in the aforementioned Item [2] or [3], wherein the matrix material is synthetic resin.

[8] The electrolytic capacitor as recited in the aforementioned Item [7], wherein the synthetic resin is polyolefin.

[9] The electrolytic capacitor as recited in the aforementioned Item [8], wherein the polyolefin is polypropylene and/or polyethylene.

[10] The electrolytic capacitor as recited in any one of the aforementioned Items [1] to [3], wherein the heat conductive material is in contact with the capacitor element by 30% or more of a height of the capacitor element.

[11] The electrolytic capacitor as recited in any one of the aforementioned Items [1] to [3], wherein the external casing is made of aluminum.

[12] The electrolytic capacitor as recited in any one of the aforementioned Items [1] to [3], wherein the electrolytic capacitor is an aluminum electrolytic capacitor.

[13] The electrolytic capacitor as recited in any one of the aforementioned Items [1] to [3], wherein the capacitor element includes an anode foil, a cathode foil and a separator disposed between the anode foil and the cathode foil.

[14] An electrolytic capacitor, comprising:
an external casing made of aluminum; and
a capacitor element enclosed in the external casing,
wherein an external peripheral surface of the external casing is covered with an insulation film.

[15] The electrolytic capacitor as recited in the aforementioned Item [14], wherein the insulation film is an aluminum oxide film.

[16] The electrolytic capacitor as recited in the aforementioned Item [14], wherein the insulation film is an aluminum nitride film.

[17] An electrolytic capacitor, comprising:
an external casing made of aluminum; and
a capacitor element enclosed in the external casing,
wherein an external peripheral surface of the external casing is covered with an anodic oxide film formed by a surface treatment.

[18] An electrolytic capacitor, comprising:
an external casing made of aluminum; and
a capacitor element enclosed in the external casing,
wherein an external peripheral surface of the external casing is covered with an aluminum nitride film formed by a surface nitriding treatment.

[19] The electrolytic capacitor as recited in any one of the aforementioned Items [14] to [18], wherein a thickness of the film is 1 to 20 μm.

[20] The electrolytic capacitor as recited in any one of the aforementioned Items [14] to [18], further comprising a heat conductive material having heat conductivity of 1 W/m·K or more disposed between the external casing and the capacitor element so as to be in contact with the external casing and the capacitor element.

[21] The electrolytic capacitor as recited in the aforementioned Item [20], wherein the heat conductive material having heat conductivity of 1 W/m·K or more is a heat conductive material in which one or more kinds of particles selected from the group consisting of an alumina particle, an aluminum nitride particle, a boron nitride particle and a zinc oxide particle dispersed in a matrix material.

[22] The electrolytic capacitor as recited in the aforementioned Item [20], wherein the heat conductive material having heat conductivity of 1 W/m·K or more is a heat conductive material in which alumina particles are dispersed in a matrix material.

[23] The electrolytic capacitor as recited in the aforementioned Item [21] or [22], wherein an average particle diameter of the particle is 0.5 to 5 μm.

[24] The electrolytic capacitor as recited in the aforementioned Item [21] or [22], wherein a content rate of the particle in the heat conductive material is 70 mass % or more.

[25] The electrolytic capacitor as recited in the aforementioned Item [21] or [22], wherein the matrix material is silicone oil and/or denatured silicone oil.

[26] The electrolytic capacitor as recited in the aforementioned Item [21] or [22], wherein the matrix material is synthetic resin.

[27] The electrolytic capacitor as recited in the aforementioned Item [26], wherein the synthetic resin is polyolefin.

[28] The electrolytic capacitor as recited in the aforementioned Item [27], wherein the polyolefin is polypropylene and/or polyethylene.

[29] The electrolytic capacitor as recited in any one of the aforementioned Items [20] to [22], wherein the heat conductive material is in contact with the capacitor element by 30% or more of a height of the capacitor element.

[30] The electrolytic capacitor as recited in any one of the aforementioned Items [14] to [18], wherein the electrolytic capacitor is an aluminum electrolytic capacitor.

[31] The electrolytic capacitor as recited in any one of the aforementioned Items [14] to [18], wherein the capacitor element includes an anode foil, a cathode foil and a separator disposed between the anode foil and the cathode foil.

According to the invention as recited in Item [1], since a heat conductive material having heat conductivity of 1 W/m·K or more is disposed between the external casing and the capacitor element so as to be in connect with them, the heat generated in the capacitor element is efficiently transferred to the external casing via the heat conductive material and then to the outside to thereby prevent the capacitor element from being reached a high temperature, resulting in an electrolytic capacitor long in useful time longevity. Furthermore, since the electrolytic capacitor is excellent in heat dissipation, even in cases where intense current or high ripple current is applied, the temperature rise of the capacitor element can be sufficiently restrained. In addition, since the heat dissipation can be improved by simply disposing the aforementioned specific heat conductive material between the external casing and the capacitor element without changing the design of the capacitor element itself and/or the inner structure, the electrolytic capacitor can be manufactured at low cost.

According to the invention as recited in Item [2], since a heat conductive material in which one or more kinds of particles selected from the group consisting of an alumina particle, an aluminum nitride particle, a boron nitride particle and a zinc oxide particle are dispersed in a matrix material is used as the heat conductive material, in other words, since a heat conductive material in which the aforementioned specific compounds excellent in heat conductivity are dispersed in a matrix material, the heat generated in the capacitor element is more efficiently transferred to the external casing via the heat conductive material and then to the outside, thereby more efficiently preventing the capacitor element from reaching a high temperature.

According to the invention as recited in Item [3], since, as the heat conductive material, a heat conductive material in which alumina particles are dispersed in a matrix material is used, the heat generated in the capacitor element is more efficiently transferred to the external casing via the heat conductive material and then to the outside, thereby more efficiently preventing the capacitor element from reaching a high temperature.

According to the invention as recited in Item [4], since the average particle diameter of the particle is 0.5 to 5 μm, the heat dissipation can be further enhanced.

According to the invention as recited in Item [5], since the content rate of the particle in the heat conductive material is set to be 70 mass % or more, the heat dissipation of the electrolytic capacitor can be further enhanced at lower cost.

According to the invention as recited in Item [6], since silicone oil (including denatured type) is used as the matrix material, the heat dissipation of the electrolytic capacitor can be further enhanced.

According to the invention as recited in Item [7], since synthetic resin is used as the matrix material, the heat dissipation of the electrolytic capacitor can be further enhanced at lower cost.

According to the invention as recited in Item [8], since polyolefin is used as the synthetic resin, the heat dissipation of the electrolytic capacitor can be further enhanced.

According to the invention as recited in Item [9], since polypropylene and/or polyethylene is used as the aforementioned polyolefin, the electrolytic capacitor can be manufactured at lower cost. Furthermore, since the matrix material includes no-halogen, the electrolytic capacitor causes less environmental damage.

According to the invention as recited in Item [10], since the heat conductive material is in contact with the capacitor element by 30% or more of a height of the capacitor, sufficiently excellent heat dissipation can be attained.

According to the invention as recited in Item [11], since the external casing is made of aluminum, weight saving can be attained and the heat dissipation of the electrolytic capacitor can be further enhanced.

According to the invention as recited in Item [12], an electrolytic capacitor with excellent heat releasing characteristics can be provided.

According to the invention as recited in Item [13], an electrolytic capacitor with sufficient capacitance and excellent heat dissipation performance can be provided.

According to the invention as recited in Item [14], since the external casing is made of aluminum excellent in heat conductivity and the insulation film integrally covers the external peripheral surface of the external casing with no air layer formed therebetween, the heat generated in the capacitor element is efficiently transferred to the external casing via the heat conductive material and then to the outside to thereby prevent the capacitor element from reaching a high temperature, resulting in an electrolytic capacitor long in useful time longevity. Furthermore, since the electrolytic capacitor is excellent in heat dissipation, even in cases where intense current or high ripple current is applied, the temperature rise of the capacitor element can be sufficiently restrained. Furthermore, since the insulation film is formed on the external peripheral surface of the external casing, insulation against the outside can be secured. Furthermore, since the heat dissipation can be enhanced by simply forming the insulation film on the external surface of the external casing and no design change of the capacitor element itself and/or the inner structure itself is required, the electrolytic capacitor can be manufactured at lower cost.

According to the invention as recited in Item [15], since the insulation film is an aluminum oxide film, insulation against the outside can be assuredly secured.

According to the invention as recited in Item [16], since the insulation film is an aluminum nitride film, insulation against the outside can be assuredly secured.

According to the invention as recited in Item [17], since the external casing is made of aluminum excellent in heat conductivity and the anodic oxide film integrally covers the external casing with no air layer formed therebetween, the heat generated in the capacitor element is efficiently transferred to the outside via the external casing and the anodic oxide film to thereby prevent the capacitor element from reaching a high temperature, resulting in an electrolytic capacitor long in useful time longevity. Furthermore, since the electrolytic capacitor is excellent in heat dissipation, even in cases where intense current or high ripple current is applied, the temperature rise of the capacitor element can be sufficiently restrained. Furthermore, since the insulation film is made of an anodic oxide film, insulation against the outside can be secured. Furthermore, this anodic oxide film is formed by subjecting the external peripheral surface of the external casing to a surface treatment, sufficient joining strength can be secured between the external casing and the anodic oxide film. As a result, the anodic oxide film would not be exfoliated, resulting in an electrolytic capacitor excellent in durability. In addition to the above, since the heat dissipation can be enhanced by simply forming the anodic oxide film on the external surface of the external casing and no design change of the capacitor element itself and/or the inner structure itself is required, the electrolytic capacitor can be manufactured at lower cost.

According to the invention as recited in Item [18], since the external casing is made of aluminum excellent in heat conductivity and the aluminum nitride film integrally covers the external casing with no air layer formed therebetween, the heat generated in the capacitor element is efficiently transferred to the outside via the external casing and the aluminum nitride film to thereby prevent the capacitor element from reaching a high temperature, resulting in an electrolytic capacitor long in useful time longevity. Further, since the electrolytic capacitor is excellent in heat dissipation, even in cases where intense current or high ripple current is applied, the temperature rise of the capacitor element can be sufficiently restrained. Furthermore, since the insulation film is made of an aluminum nitride film, insulation against the outside can be secured assuredly. Furthermore, this aluminum nitride film is formed by subjecting the external peripheral surface of the external casing to a surface nitriding treatment, sufficient joining strength can be secured between the external casing and the aluminum nitride film. As a result, the aluminum nitride film would not be exfoliated, resulting in an electrolytic capacitor excellent in durability. In addition to the above, since the heat dissipation can be enhanced by simply forming the aluminum nitride film on the external surface of the external casing and no design change of the capacitor element itself and/or the inner structure itself is required, the electrolytic capacitor can be manufactured at lower cost.

According to the invention as recited in Item [19], excellent heat dissipation can be secured with sufficient insulation against the outside.

According to the invention as recited in Item [20], since a heat conductive material having heat conductivity of 1 W/m·K or more is disposed between the external casing and the capacitor element so as to be in contact with the external casing and the capacitor element, the heat generated in the capacitor element is efficiently transferred to the outside via the heat conductive material to thereby further enhancing the heat dissipation performance.

According to the invention as recited in Item [21], since a heat conductive material in which one or more kinds of particles selected from the group consisting of an alumina particle, an aluminum nitride particle, a boron nitride particle and a zinc oxide particle are dispersed in a matrix material is used as the heat conductive material, in other words, since a heat conductive material in which the aforementioned specific compounds excellent in heat conductivity are dispersed in a matrix material, the heat generated in the capacitor element is more efficiently transferred to the external casing via the heat conductive material and then to the outside, thereby more efficiently preventing the capacitor element from reaching a high temperature.

According to the invention as recited in Item [22], since a heat conductive material in which alumina particles are dispersed in a matrix material is used as the heat conductive material, the heat generated in the capacitor element is more efficiently transferred to the external casing via the heat conductive material and then to the outside, thereby more efficiently preventing the capacitor element from reaching a high temperature.

According to the invention as recited in Item [23], since the average particle diameter of the particle is 0.5 to 5 μm, the heat dissipation can be further enhanced.

According to the invention as recited in Item [24], since the content rate of the particle in the heat conductive material is set to be 70 mass % or more, the heat dissipation of the electrolytic capacitor can be further enhanced at lower cost.

According to the invention as recited in Item [25], since silicone oil (including denatured type) is used as the matrix material, the heat dissipation of the electrolytic capacitor can be further enhanced.

According to the invention as recited in Item [26], since synthetic resin is used as the matrix material, the heat dissipation of the electrolytic capacitor can be further enhanced at lower cost.

According to the invention as recited in Item [27], since polyolefin is used as the matrix material, the heat dissipation of the electrolytic capacitor can be further enhanced.

According to the invention as recited in Item [28], since polypropylene and/or polyethylene is used as the aforementioned polyolefin, the electrolytic capacitor can be manufactured at low cost. Furthermore, since the matrix material includes no-halogen, the electrolytic capacitor causes less environmental damage.

According to the invention as recited in Item [29], since the heat conductive material is in contact with the capacitor element by 30% or more of a height of the capacitor, excellent heat dissipation can be attained with less amount of heat conductive material.

According to the invention as recited in Item [30], an electrolytic capacitor excellent in heat dissipation performance can be provided.

According to the invention as recited in Item [31], an electrolytic capacitor with sufficient capacitance and excellent heat dissipation performance can be provided.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

An electrolytic capacitor 1 according to the present invention can be any electrolytic capacitor required to have heat dissipation performance. For example, a capacitor using a valve action metal, a ceramics capacitor, a film capacitor and a styrol capacitor can be exemplified. Among other things, the electrolytic capacitor of the present invention can be preferable applied to a capacitor using a valve action metal, e.g., an aluminum electrolytic capacitor, a tantalum electrolytic capacitor, a niobium series (including niobium oxide) capacitor. The aforementioned valve action metal denotes a metal in which an oxide film to be formed on the metal has a rectifying action or a characteristic which allows electric current in one direction but hardly allows electric current in the other direction.

Figure 1:
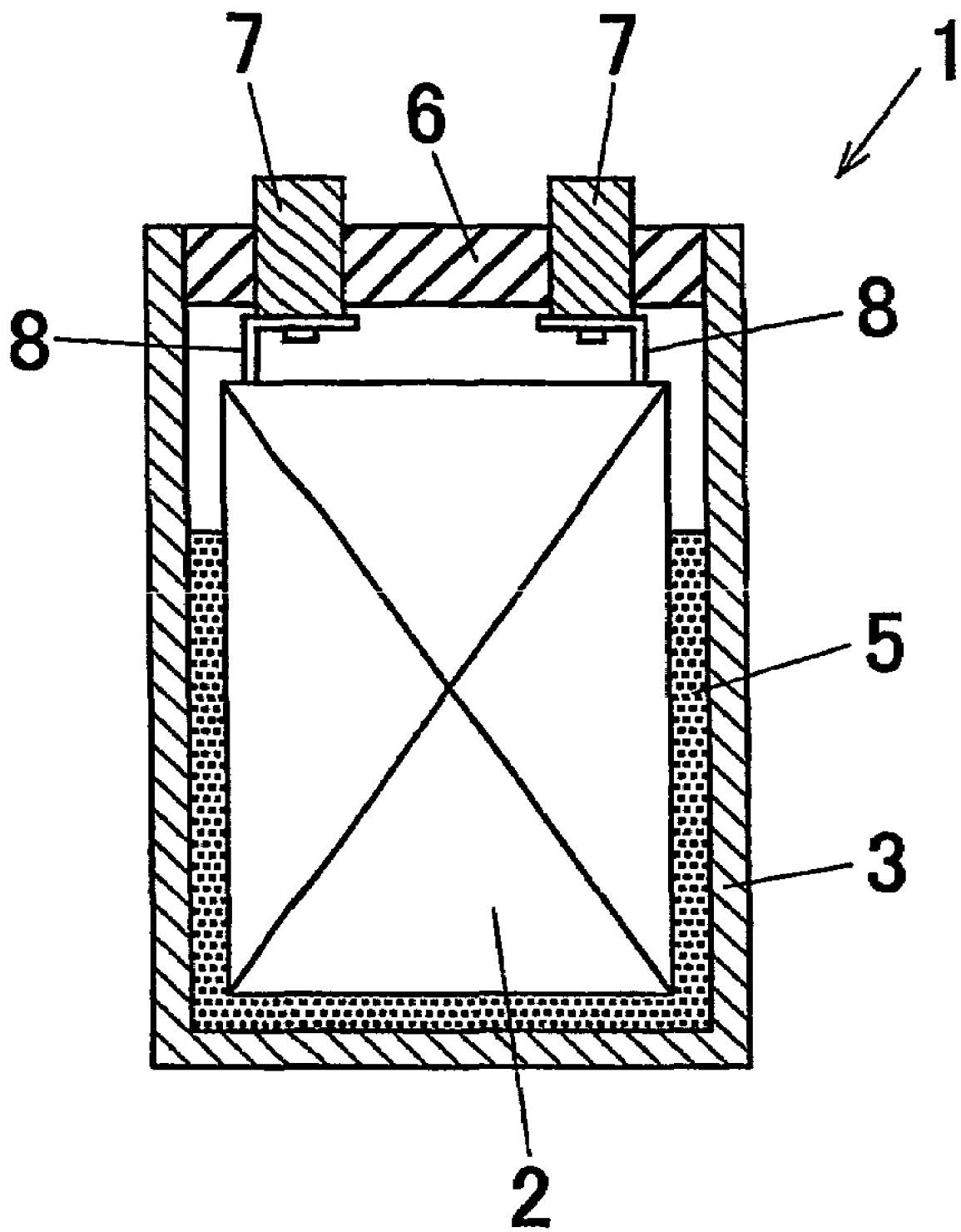
FIG. 1 is a vertical cross-sectional view showing an embodiment of an electrolytic capacitor according to a first invention.

FIG. 1 shows a cross-section of an electrolytic capacitor 1 according to an embodiment of a first invention. This electrolytic capacitor 1 is an aluminum electrolytic capacitor including a capacitor element 2, a cylindrical external casing 3 with a bottom accommodating the capacitor element 2, an electric insulation cap 6 closing the upper opened portion of the external casing 3, a pair of electrical terminals 7 and 7 penetrating the cap 6, lead lines 8 and 8 each connecting the capacitor element 2 to the lower end portion of the corresponding electrical terminal 7. Within a gap formed between the external casing 3 and the capacitor element 2, heat conductive material 5 having heat conductivity of 1 W/m·K or more is filled so as to be in contact with the external casing 3 and the capacitor element 2. In this electrolytic capacitor 1, the heat generated in the capacitor element 2 is efficiently transferred to the external casing 3 via the heat conductive material 5 and then to the outside to thereby prevent the capacitor element 2 from reaching a high temperature, resulting in an electrolytic capacitor long in useful time longevity. Furthermore, since the electrolytic capacitor 1 is excellent in heat dissipation, even in cases where intense current or high ripple current is applied, the temperature rise of the capacitor element 2 can be sufficiently restrained.

The capacitor element 2 includes an anode foil and a cathode foil wounded with a separator disposed therebetween. The capacitor element 2 is impregnated with electrolytic solution.

As the external casing 3, it is preferably to employ a metallic one, and more preferably, an aluminum one. In cases where aluminum one is employed, the electrolytic capacitor 1 can be light in weight, and also can be improved in heat dissipation performance.

As the heat conductive material 5 having heat conductivity of 1 W/m·K or more, it is preferable to employ a heat conductive material in which one or more kinds of particles selected from the group consisting of an alumina particle, an aluminum nitride particle, a boron nitride particle and a zinc oxide particle are dispersed in a matrix material. In this case, the heat generated in the capacitor element 2 is more efficiently transferred to the external casing 3 via the heat conductive material 5 and then to the outside, thereby more efficiently preventing the capacitor element 2 from reaching a high temperature. Among other things, as the heat conductive material 5, it is especially preferable to employ a heat conductive material in which alumina particles are dispersed in a matrix material. In this case, it is possible to more efficiently prevent the capacitor element 2 from reaching a high temperature.

The average particle diameter of the particle preferably falls within the range of from 0.5 to 5 μm. If it is less than 0.5 μm, it is not preferable since there is the possibility that the particles become easily agglutinated in the matrix material. On the other hand, if it exceeds 5 μm, it is not preferable because of the following reasons. The dispersion stability of the particles in the matrix material deteriorates, which may sometimes cause the particles to be easily deposited in the matrix member. This in turn makes it difficult to transfer the heat generated in the capacitor element 2 to the external casing 3. Especially, it is preferable that the average particle diameter of the particle falls within the range of from 1 to 4 μm The content rate of the particle in the heat conductive material 5 is preferably set to be 70 mass % or more. If it is less than 70 mass %, it is not preferable because there is a possibility that excellent heat dissipation performance cannot be obtained. The upper limit of the content rate of the particle is 90 mass % or less. If it exceeds 90 mass %, the fluidity deteriorates, resulting in deteriorated heat conductivity, and therefore it is not preferable that the content rate exceeds 90 mass %.

Although the matrix material is not limited to a specific one, for example, denatured silicone oil such as alkyl denatured silicone oil or epoxy denatured silicone oil as well as silicone oil can be preferably used. Among other things, it is more preferable to use denatured silicone oil. In this case, the heat conduction due to the heat convection of the matrix material will be effectively enhanced, which further enhances the heat dissipation of the electrolytic capacitor.

As the matrix material, other than the above-exemplified compounds, various synthetic resins, such as aliphatic resin (polyolefin, etc), unsaturated polyester resin, acrylic resin, meta-acrylic resin, vinylester resin, epoxy resin or silicone resin, can be used. The aforementioned synthetic resin can be low molecular weight resin, and can also be high molecular weight resin. Furthermore, the synthetic resin can be any one of oil-like resin, rubber-like resin and solid resin. Among these synthetic resins, polyolefin is preferable. More preferable resins are polypropylene and polyethylene.

In the first invention, the heat conductive material 5 is filled between the external casing 3 and the capacitor element 2. The filling height of the heat conductive material 5 is preferably 30% or more of the height of the capacitor element 2. In other words, it is preferable that the heat conductive material 5 is in contact with the capacitor element 2 by 30% or more of the height of the capacitor element 2. This structure secures sufficient heat dissipation.

Figure 2:
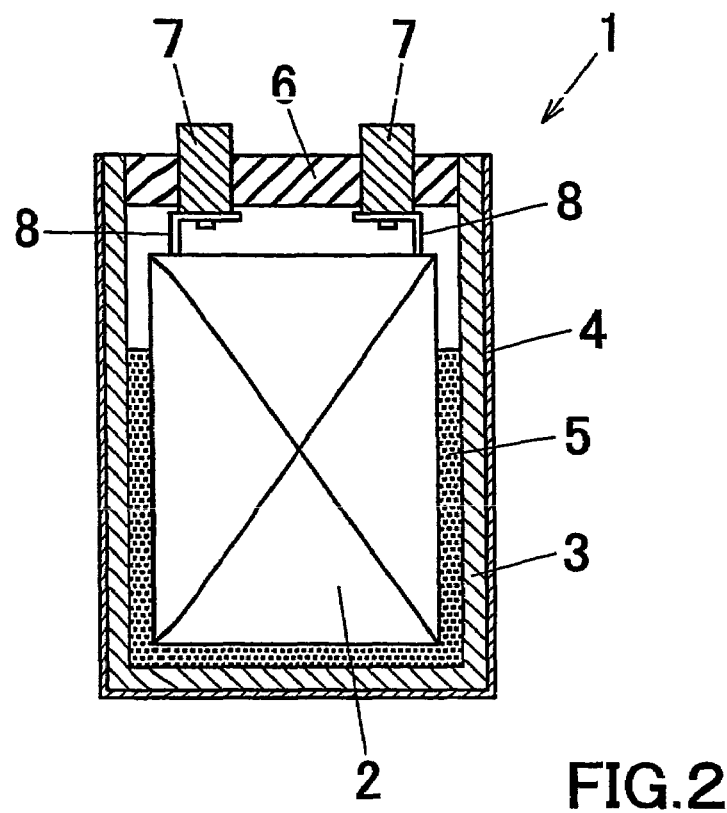
FIG. 2 is a vertical cross-sectional view showing an embodiment of an electrolytic capacitor according to a second invention.

FIG. 2 shows a cross-sectional view of an electrolytic capacitor 1 according to an embodiment of a second invention. This electrolytic capacitor 1 is an aluminum electrolytic capacitor including a capacitor element 2, a cylindrical external casing 3 with a bottom accommodating the capacitor element 2, an insulation film 4 formed on the external peripheral surface of the external casing 3, an electric insulation cap 6 closing the upper opened portion of the external casing 3, a pair of electrical terminals 7 and 7 penetrating the cap 6, lead lines 8 and 8 each connecting the capacitor element 2 to the lower end portion of the corresponding electrical terminal 7. The insulation film 4 integrally covers the external peripheral surface of the external casing 3 without intervening an air layer therebetween. The capacitor element 2 includes an anode foil and a cathode foil wounded with a separator disposed therebetween. The capacitor element 2 is impregnated with electrolytic solution.

In this electrolytic capacitor 1, since the external casing 3 is made of aluminum excellent in heat conductivity and the insulation film 4 integrally covers the external casing 3 without intervening an air layer therebetween, the heat generated in the capacitor element 2 will be released outside efficiently via the external casing 3 and the insulation film 4. This prevents the capacitor element 2 from reaching a high temperature. Furthermore, since the insulation film 4 is formed on the external peripheral surface of the external casing 3, insulation against outside can be secured.

Furthermore, in this embodiment, the electrolytic capacitor is constituted such that heat conductive material 5 having heat conductivity of 1 W/m·K or more is filled in the gap formed between the external casing 3 and the capacitor element 2 so as to be in contact with them, the heat generated in the capacitor element 2 is efficiently transferred to the external casing 3 via the heat conductive material 5. Therefore, the heat dissipation of the electrolytic capacitor 1 can be further enhanced.

In this second invention, the thickness of the insulation film 4 is preferably set to be 1 to 20 μm because of the following reasons. If the thickness is less than 1 μm, the insulation film 4 may fall off when other objects come into contact with the insulation film to cause insulation failure. On the other hand, if it exceeds 20 μm, the insulation film 4 itself may function as thermal resistance to deteriorate the heat dissipation. Especially, it is preferable to set the thickness of the insulation film 4 to be 3 to 10 μm.

Although the insulation film 4 is not limited to a specific one, an aluminum oxide film or an aluminum nitride film can be preferably used as the insulation film 4. In the case of the aluminum oxide film or the aluminum nitride film, secure insulation can be attained. Other than the above, a coating formed by applying paint having insulation performance on the external casing 3 can be also used as the insulation film 4. Furthermore, such insulation coating can be integrally laminated on the aluminum oxide film or the aluminum nitride film.

The aforementioned aluminum oxide film 4 can be integrally formed on the external casing 3 without intervening an air layer by subjecting the external surface of the aluminum external casing 3 to a surface treatment (e.g., anodizing). In cases where the aluminum oxide film 4 is formed by the surface treatment, sufficient bonding strength between the external casing 3 and the aluminum oxide film 4 can be obtained.

The aforementioned aluminum nitride film 4 can be integrally formed on the external casing 3 without intervening an air layer by subjecting the external surface of the aluminum external casing 3 to a surface nitriding treatment (e.g., heat treatment under the nitride atmosphere). In cases where the aluminum nitride film 4 is formed by the surface treatment, sufficient bonding strength between the external casing 3 and the aluminum nitride film 4 can be obtained.

In this embodiment, although the insulation film 4 is formed on the entire external peripheral surface of the external casing 3, the present invention is not limited to such a structure. For example, it is possible to employ such a structure that the insulation film 4 is formed on a part of the external peripheral surface of the external casing 3. From the viewpoint of enhancing the heat dissipation, however, the insulation film 4 is preferably formed on the entire external peripheral surface of the external casing 3.

In the second invention, as the heat conductive material 5 having heat conductivity of 1 W/m·K or more, the same material as in the first invention can be exemplified. That is, as the heat conductive material 5 having heat conductivity of 1 W/m·K or more, it is preferable to employ the heat conductive material in which one or more kinds of particles selected from the group consisting of an alumina particle, an aluminum nitride particle, a boron nitride particle and a zinc oxide particle are dispersed in a matrix material. In this case, the heat generated in the capacitor element 2 is more efficiently transferred to the external casing 3 via the heat conductive material 5 and then to the outside, thereby more efficiently preventing the capacitor element 2 from reaching a high temperature. Among other things, as the heat conductive material 5, it is especially preferable to employ a heat conductive material in which alumina particles are dispersed in a matrix material. In this case, it is possible to more efficiently prevent the capacitor element 2 from reaching a high temperature.

The average particle diameter of the particle preferably falls within the range of from 0.5 to 5 µm. The reasons why the particle falling within this range is preferable are the same as those in the first invention. Especially, it is preferable that the average particle diameter of the particle falls within the range of from 1 to 4 µm. Furthermore, the content rate of the particle in the heat conductive material 5 is preferably set to be 70 mass % or more. If it is less than 70 mass %, it is not preferable because there is a possibility that excellent heat dissipation cannot be obtained. The upper limit of the content rate of the particle is preferably 90 mass % or less. If it exceeds 90 mass %, the fluidity deteriorates, resulting in deteriorated heat conductivity, and therefore it is not preferable that the content rate exceeds 90 mass %.

Although the matrix material is not limited to a specific one, for example, denatured silicone oil such as alkyl denatured silicone oil or epoxy denatured silicone oil as well as silicone oil can be preferably used. Among other things, it is more preferable to use denatured silicone oil. In this case, the heat conduction due to the heat convection of the matrix material 5 will be effectively enhanced, which further enhances the heat dissipation of the electrolytic capacitor 1.

As the matrix material, other than the above-exemplified compounds, various synthetic resins, such as aliphatic resin (polyolefin, etc), unsaturated polyester resin, acrylic resin, meta-acrylic resin, vinylester resin, epoxy resin or silicone resin, can be used. The aforementioned synthetic resin can be low molecular weight resin, and can also be high molecular weight resin. Furthermore, the synthetic resin can be any one of oil-like resin, rubber-like resin and solid resin. Among these synthetic resins, polyolefin is preferable. More preferable resins are polypropylene and polyethylene.

In the second invention, in cases where the heat conductive material 5 is filled between the external casing 3 and the capacitor element 2, the filling height of the heat conductive material 5 is preferably 30% or more of the height of the capacitor element 2. In other words, it is preferable that the capacitor element 2 is in contact with the heat conductive material 5 by 30% or more of the height of the capacitor element 2. This structure secures sufficient heat dissipation.

The electrolytic capacitor according to the present invention is not limited to the aforementioned embodiments and can be any modifications thereof. For example, in the aforementioned embodiments, although the pair of electrical terminals 7 and 7 are provided at the upper portion of the electrolytic capacitor, it can be constituted such that one of the electrical terminals is provided at the upper portion of the electrolytic capacitor and the other is provided at the lower portion of the electrolytic capacitor.

Concrete examples of the present invention will be explained as follows.

EXAMPLE 1

An electrolytic capacitor as shown in FIG. 1 was manufactured. The external casing 3 was made of vinyl chloride resin. As the heat conductive material 5, a heat conductive material in which alumina particles (average particle diameter was 2.5 µm) of 80 mass % were dispersed in a matrix material was used. This heat conductive material was filled up to the position which is 80% of the height of the capacitor element 2.

EXAMPLE 2

An electrolytic capacitor was obtained in the same manner as in Example 1 except that alumina particles whose average particle was 1.0 µm were used as the aforementioned alumina particles.

EXAMPLE 3

An electrolytic capacitor was obtained in the same manner as in Example 1 except that alumina particles whose average particle was 3.0 µm were used as the aforementioned alumina particles.

EXAMPLE 4

An electrolytic capacitor was obtained in the same manner as in Example 1 except that alumina particles whose average particle was 4.0 µm were used as the aforementioned alumina particles.

EXAMPLE 5

An electrolytic capacitor was obtained in the same manner as in Example 1 except that the content rate of the alumina particles was set to be 70 mass %.

EXAMPLE 6

An electrolytic capacitor was obtained in the same manner as in Example 1 except that the content rate of the alumina particles was set to be 85 mass %.

EXAMPLE 7

An electrolytic capacitor was obtained in the same manner as in Example 1 except that the content rate of the alumina particles was set to be 90 mass %.

EXAMPLE 8

An electrolytic capacitor was obtained in the same manner as in Example 1 except that aluminum nitride particles whose average diameter was 1.5 μm were used as the aforementioned particles in place of the alumina particles whose average particle diameter was 2.5 μm.

EXAMPLE 9

An electrolytic capacitor was obtained in the same manner as in Example 1 except that boron nitride particles whose average diameter was 2.0 μm were used as the aforementioned particles in place of the alumina particles whose average particle diameter was 2.5 μm.

EXAMPLE 10

An electrolytic capacitor was obtained in the same manner as in Example 1 except that zinc oxide particles whose average diameter was 2.0 μm were used as the aforementioned particles in place of the alumina particles whose average particle diameter was 2.5 μm.

EXAMPLE 11

An electrolytic capacitor was obtained in the same manner as in Example 1 except that silicone oil was used in place of the aforementioned denatured silicone oil.

EXAMPLE 12

An electrolytic capacitor was obtained in the same manner as in Example 1 except that polypropylene was used in place of the aforementioned denatured silicone oil.

EXAMPLE 13

An electrolytic capacitor was obtained in the same manner as in Example 5 except that polypropylene was used in place of the aforementioned denatured silicone oil.

EXAMPLE 14

An electrolytic capacitor was obtained in the same manner as in Example 7 except that polypropylene was used in place of the aforementioned denatured silicone oil.

EXAMPLE 15

An electrolytic capacitor was obtained in the same manner as in Example 8 except that polypropylene was used in place of the aforementioned denatured silicone oil.

EXAMPLE 16

An electrolytic capacitor was obtained in the same manner as in Example 9 except that polypropylene was used in place of the aforementioned denatured silicone oil.

EXAMPLE 17

An electrolytic capacitor was obtained in the same manner as in Example 10 except that polypropylene was used in place of the aforementioned denatured silicone oil.

EXAMPLE 18

An electrolytic capacitor was obtained in the same manner as in Example 1 except that polyethylene was used in place of the aforementioned denatured silicone oil.

COMPARATIVE EXAMPLE 1

An electrolytic capacitor was obtained in the same manner as in Example 1 except that denatured silicone oil (not including alumina particles) was used as the heat conductive material.

COMPARATIVE EXAMPLE 2

An electrolytic capacitor was obtained in the same manner as in Example 12 except that polypropylene (not including alumina particles) was used as the heat conductive material.

With respect to the electrolytic capacitors obtained as mentioned above, the heat dissipation property was evaluated in accordance with the following evaluation method. The results are shown in Tables 1 to 3.

<Heat Dissipation Property Evaluation Method>

Ripple current 5A was applied to each capacitor element with the electrolytic capacitor disposed under the condition of ambient temperature of 35° C. to generate heat, and the temperature (maximum raised temperature) of this capacitor element at that time was measured. The temperature of the capacitor element was measured by using a thermocouple thermometer.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Composition of heat conductive material | Unit/ mass % | Alumina particle (average particle diameter 2.5 μm) | 80 | — | — | — | 70 | 85 | 90 |
| | | Alumina particle (average particle diameter 1.0 μm) | — | 80 | — | — | — | — | — |
| | | Alumina particle (average particle diameter 3.0 μm) | — | — | 80 | — | — | — | — |

TABLE 1-continued

|  |  |  | Ex. 1 | Ex. 2 | Ex. 3 | Ex. 4 | Ex. 5 | Ex. 6 | Ex. 7 |
|---|---|---|---|---|---|---|---|---|---|
|  |  | Alumina particle (average particle diameter 4.0 μm) | — | — | — | 80 | — | — | — |
|  |  | Aluminum nitride particle (average particle diameter 1.5 μm) | — | — | — | — | — | — | — |
|  |  | Boron nitride particle (average particle diameter 2.0 μm) | — | — | — | — | — | — | — |
|  |  | Zinc oxide particle (average particle diameter 2.0 μm) | — | — | — | — | — | — | — |
|  |  | Denatured silicone oil | 20 | 20 | 20 | 20 | 30 | 15 | 10 |
|  |  | Silicone oil | — | — | — | — | — | — | — |
| Heat conduction rate of the heat conductive material (W/m · K) |  |  | 2.0 | 1.8 | 2.0 | 1.7 | 1.5 | 2.2 | 2.5 |
| Generated heat temperature of the capacitor element (Maximum raised temperature ° C.) |  |  | 68.6 | 68.8 | 68.6 | 68.9 | 69.1 | 68.5 | 68.3 |

TABLE 2

|  |  |  | Ex. 8 | Ex. 9 | Ex. 10 | Ex. 11 | Comparative Ex. 1 |
|---|---|---|---|---|---|---|---|
| Composition of heat conductive material | Unit/ mass % | Alumina particle (average particle diameter 2.5 μm) | — | — | — | 80 | — |
|  |  | Alumina particle (average particle diameter 1.0 μm) | — | — | — | — | — |
|  |  | Alumina particle (average particle diameter 3.0 μm) | — | — | — | — | — |
|  |  | Alumina particle (average particle diameter 4.0 μm) | — | — | — | — | — |
|  |  | Aluminum nitride particle (average particle diameter 1.5 μm) | 80 | — | — | — | — |
|  |  | Boron nitride particle (average particle diameter 2.0 μm) | — | 80 | — | — | — |
|  |  | Zinc oxide particle (average particle diameter 2.0 μm) | — | — | 80 | — | — |
|  |  | Denatured silicone oil | 20 | 20 | 20 | — | 100 |
|  |  | Silicone oil | — | — | — | 20 | — |
| Heat conduction rate of the heat conductive material (W/m · K) |  |  | 3.0 | 2.2 | 1.0 | 2.0 | 0.3 |
| Generated heat temperature of the capacitor element (Maximum raised temperature ° C.) |  |  | 68.1 | 68.5 | 70.0 | 68.6 | 73.2 |

TABLE 3

|  |  |  | Ex. 12 | Ex. 13 | Ex. 14 | Ex. 15 | Ex. 16 | Ex. 17 | Ex. 18 | Comp. Ex. 2 |
|---|---|---|---|---|---|---|---|---|---|---|
| Composition of heat conductive material | Unit/ mass % | Alumina particle (average particle diameter 2.5 μm) | 80 | 70 | 90 | — | — | — | 80 | — |
|  |  | Alumina particle (average particle diameter 1.0 μm) | — | — | — | — | — | — | — | — |
|  |  | Alumina particle (average particle diameter 3.0 μm) | — | — | — | — | — | — | — | — |

TABLE 3-continued

|  | Ex. 12 | Ex. 13 | Ex. 14 | Ex. 15 | Ex. 16 | Ex. 17 | Ex. 18 | Comp. Ex. 2 |
|---|---|---|---|---|---|---|---|---|
| Alumina particle (average particle diameter 4.0 μm) | — | — | — | — | — | — | — | — |
| Aluminum nitride particle (average particle diameter 1.5 μm) | — | — | — | 80 | — | — | — | — |
| Boron nitride particle (average particle diameter 2.0 μm) | — | — | — | — | 80 | — | — | — |
| Zinc oxide particle (average particle diameter 2.0 μm) | — | — | — | — | — | 80 | — | — |
| Polypropylene | 20 | 30 | 10 | 20 | 20 | 20 | — | 100 |
| Polyethylene | — | — | — | — | — | — | 20 | — |
| Heat conduction rate of the heat conductive material (W/m · K) | 1.9 | 1.4 | 2.4 | 1.6 | 2.1 | 1.0 | 1.9 | 0.15 |
| Generated heat temperature of the capacitor element (Maximum raised temperature ° C.) | 68.7 | 69.2 | 68.4 | 69.0 | 68.6 | 70.3 | 68.7 | 74.5 |

As will be apparent from Tables 1 to 3, the electrolytic capacitors of Examples 1 to 18 according to the present invention were excellent in heat dissipation property, and the temperature rise due to the heat generated in the capacitor element was effectively suppressed. To the contrary, in the electrolytic capacitors of Comparative Examples 1 and 2, the heat dissipation property was insufficient, and the temperature rise due to the heat generated in the capacitor element was large.

EXAMPLE 19

An electrolytic capacitor as shown in FIG. 2 was manufactured. In manufacturing the capacitor, silicone oil (not including particles) was used as the heat conductive material 5, and the external casing 3 made of aluminum was used. The external casing 3 was subjected to a surface treatment (anodizing) under the conditions of sulfuric acid concentration of 15%, liquid temperature of 20° C., and current density of 1.5 A/dm², to thereby form a 5 μm thick aluminum oxide film 4 on the external peripheral surface of the external casing 3. A heat conductive material was filled between the capacitor element 2 and the external casing 3 so that the heat conductive material comes into contact with the capacitor element 2 by 80% of the height of the capacitor element.

EXAMPLE 20

An electrolytic capacitor was obtained in the same manner as in Example 19 except that the thickness of oxide aluminum film to be formed is set to be 10 μm.

EXAMPLE 21

An electrolytic capacitor was obtained in the same manner as in Example 19 except that the thickness of oxide aluminum film to be formed is set to be 15 μm.

EXAMPLE 22

An electrolytic capacitor as shown in FIG. 2 was manufactured. In manufacturing the capacitor, silicone oil (not including particles) was used as the heat conductive material 5, and the external casing 3 made of aluminum was used. The external casing 3 was subjected to a surface nitriding treatment (heat treatment under nitrogen atmosphere) under the conditions of nitriding temperature of 450° C. and holding hours of 8 hours, to thereby form a 3 μm thick aluminum nitride film 4 on the external peripheral surface of the external casing 3. A heat conductive material was filled between the capacitor element 2 and the external casing 3 so that the heat conductive material comes into contact with the capacitor element 2 by 80% of the height of the capacitor element.

EXAMPLE 23

An electrolytic capacitor was obtained in the same manner as in Example 19 except that the thickness of aluminum nitride film to be formed is set to be 8 μm.

EXAMPLE 24

An electrolytic capacitor was obtained in the same manner as in Example 19 except that the thickness of aluminum nitride film to be formed is set to be 13 μm.

EXAMPLE 25

An electrolytic capacitor was obtained in the same manner as in Example 19 except that a heat conductive material in which alumina particles having an average particle diameter of 2.5 μm were dispersed in epoxy denatured silicone oil was used as the heat conductive material to be filled between the external casing and the capacitor element so as to be in contact with them. The content rate of the alumina particle in the heat conductive material was 80 mass %. The heat conductive material was filled such that the heat conductive material comes into contact with the capacitor element by 80% of the height of the capacitor element.

EXAMPLE 26

An electrolytic capacitor was obtained in the same manner as in Example 25 except that a heat conductive material in which aluminum nitride particles having an average particle diameter of 1.5 μm (the content rate of the aluminum nitride particle was 80 mass %) were dispersed in epoxy denatured silicone oil was used as the heat conductive material.

EXAMPLE 27

An electrolytic capacitor was obtained in the same manner as in Example 25 except that a heat conductive material in which boron nitride particles having an average particle diameter of 2.0 μm (the content rate of the boron nitride particle was 80 mass %) were dispersed in epoxy denatured silicone oil was used as the heat conductive material.

EXAMPLE 28

An electrolytic capacitor was obtained in the same manner as in Example 25 except that a heat conductive material in which zinc oxide particles having an average particle diameter of 2.0 μm (the content rate of the zinc oxide particle was 90 mass %) were dispersed in epoxy denatured silicone oil was used as the heat conductive material.

EXAMPLE 29

An electrolytic capacitor was obtained in the same manner as in Example 25 except that silicone oil was used in place of the denatured silicone oil.

EXAMPLE 30

An electrolytic capacitor was obtained in the same manner as in Example 22 except that a heat conductive material to be filled between the external casing and the capacitor element so as to be in contact with them in which alumina particles having an average particle diameter of 2.5 μm were dispersed in epoxy denatured silicone oil was used as the heat conductive material. The content rate of the epoxy denatured silicone oil was 80 mass %. Furthermore, the heat conductive material was filled such that the heat conductive material came into contact with the capacitor element by 80% of the height of the conductive material.

EXAMPLE 31

An electrolytic capacitor was obtained in the same manner as in Example 30 except that a heat conductive material in which aluminum nitride particles having an average particle diameter of 1.5 μm (the content rate of the aluminum nitride particle was 80 mass %) were dispersed in epoxy denatured silicone oil was used as the heat conductive material.

EXAMPLE 32

An electrolytic capacitor was obtained in the same manner as in Example 30 except that a heat conductive material in which boron nitride particles having an average particle diameter of 2.0 μm (the content rate of the boron nitride particle was 80 mass %) were dispersed in epoxy denatured silicone oil was used as the heat conductive material.

EXAMPLE 33

An electrolytic capacitor was obtained in the same manner as in Example 30 except that a heat conductive material in which zinc oxide particles having an average particle diameter of 2.0 μm (the content rate of the zinc oxide particle was 90 mass %) were dispersed in epoxy denatured silicone oil was used as the heat conductive material.

EXAMPLE 34

An electrolytic capacitor was obtained in the same manner as in Example 30 except that silicone oil was used in place of the denatured silicone oil.

EXAMPLE 35

An electrolytic capacitor was obtained in the same manner as in Example 25 except that a heat conductive material in which alumina particles having an average particle diameter of 2.5 μm (the content rate of the alumina particle was 80 mass %) were dispersed in polypropylene was used as the heat conductive material.

EXAMPLE 36

An electrolytic capacitor was obtained in the same manner as in Example 25 except that a heat conductive material in which alumina particles having an average particle diameter of 2.5 μm (the content rate of the alumina particle was 70 mass %) were dispersed in polypropylene was used as the heat conductive material.

EXAMPLE 37

An electrolytic capacitor was obtained in the same manner as in Example 25 except that a heat conductive material in which alumina particles having an average particle diameter of 2.5 μm (the content rate of the alumina particle was 90 mass %) were dispersed in polypropylene was used as the heat conductive material.

EXAMPLE 38

An electrolytic capacitor was obtained in the same manner as in Example 25 except that a heat conductive material in which aluminum nitride particles having an average particle diameter of 1.5 μm (the content rate of the aluminum nitride particle was 80 mass %) were dispersed in polypropylene epoxy was used as the heat conductive material.

EXAMPLE 39

An electrolytic capacitor was obtained in the same manner as in Example 25 except that a heat conductive material in which boron nitride particles having an average particle diameter of 2.0 μm (the content rate of the aluminum nitride particle was 80 mass %) were dispersed in polypropylene epoxy was used as the heat conductive material.

EXAMPLE 40

An electrolytic capacitor was obtained in the same manner as in Example 25 except that a heat conductive material in which zinc oxide particles having an average particle diameter of 2.0 μm (the content rate of the zinc oxide particle was 80 mass %) were dispersed in polypropylene was used as the heat conductive material.

EXAMPLE 41

An electrolytic capacitor was obtained in the same manner as in Example 25 except that a heat conductive material in which alumina particles having an average particle diameter of 2.5 µm (the content rate of the alumina particle was 80 mass %) were dispersed in polyethylene was used as the heat conductive material.

EXAMPLE 42

An electrolytic capacitor was obtained in the same manner as in Example 30 except that a heat conductive material in which alumina particles having an average particle diameter of 2.5 µm (the content rate of the alumina particle was 80 mass %) were dispersed in polypropylene was used as the heat conductive material.

EXAMPLE 43

An electrolytic capacitor was obtained in the same manner as in Example 30 except that a heat conductive material in which alumina particles having an average particle diameter of 2.5 µm (the content rate of the alumina particle was 70 mass %) were dispersed in polypropylene was used as the heat conductive material.

EXAMPLE 44

An electrolytic capacitor was obtained in the same manner as in Example 30 except that a heat conductive material in which alumina particles having an average particle diameter of 2.5 µm (the content rate of the alumina particle was 90 mass %) were dispersed in polypropylene was used as the heat conductive material.

EXAMPLE 45

An electrolytic capacitor was obtained in the same manner as in Example 30 except that a heat conductive material in which aluminum nitride particles having an average particle diameter of 1.5 µm (the content rate of the aluminum nitride particle was 80 mass %) were dispersed in polypropylene was used as the heat conductive material.

EXAMPLE 46

An electrolytic capacitor was obtained in the same manner as in Example 30 except that a heat conductive material in which boron nitride particles having an average particle diameter of 2.0 µm (the content rate of the boron nitride particle was 80 mass %) were dispersed in polypropylene was used as the heat conductive material.

EXAMPLE 47

An electrolytic capacitor was obtained in the same manner as in Example 30 except that a heat conductive material in which zinc oxide particles having an average particle diameter of 2.0 µm (the content rate of the zinc oxide particle was 80 mass %) were dispersed in polypropylene was used as the heat conductive material.

EXAMPLE 48

An electrolytic capacitor was obtained in the same manner as in Example 30 except that a heat conductive material in which alumina particles having an average particle diameter of 2.5 µm (the content rate of the alumina particle was 80 mass %) were dispersed in polyethylene was used as the heat conductive material.

COMPARATIVE EXAMPLE 3

Figure 3:
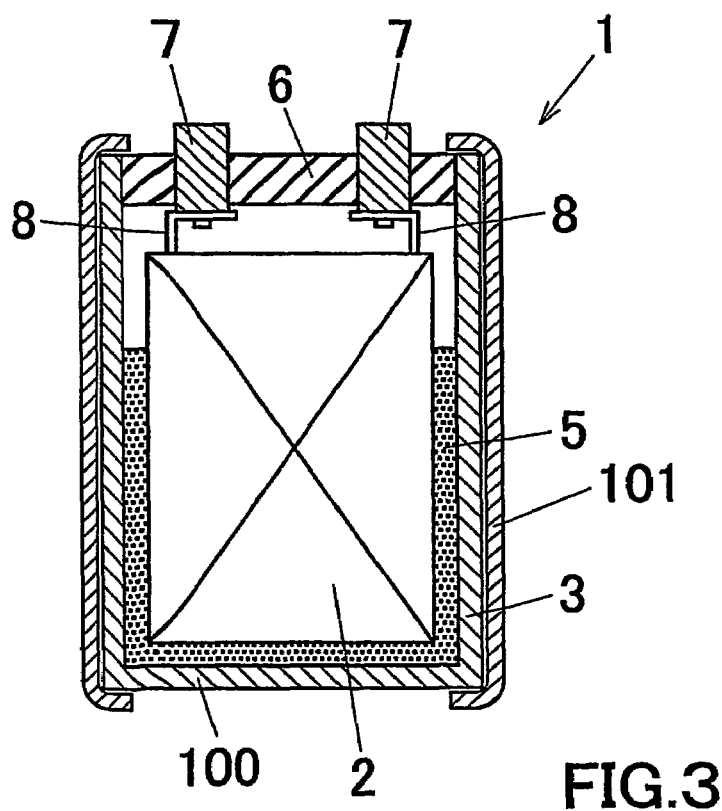
FIG. 3 is a vertical cross-sectional view showing a conventional electrolytic capacitor.

An electrolytic capacitor as shown in FIG. 3 was manufactured. In manufacturing the capacitor, silicone oil (not including particles) was used as the heat conductive material 5, and the external casing 100 made of aluminum was used. On the outside of the external casing 100, a sleeve 101 made of vinyl chloride resin was fitted.

With respect to the electrolytic capacitors obtained as mentioned above, the heat dissipation property was evaluated in accordance with the aforementioned heat dissipation property evaluation method. The results are shown in Tables 4 to 8.

TABLE 4

|  |  | Ex. 19 | Ex. 20 | Ex. 21 | Ex. 22 | Ex. 23 | Ex. 24 | Comp. Ex. 3 |
|---|---|---|---|---|---|---|---|---|
| Insulation film | Type | Aluminum oxide film | Aluminum oxide film | Aluminum oxide film | Aluminum nitride film | Aluminum nitride film | Aluminum nitride film |  |
|  | Thickness (µm) | 5 | 10 | 15 | 3 | 8 | 13 |  |
| Heat conduction rate of the heat conductive material (W/m · K) |  | 0.3 | 0.3 | 0.3 | 0.3 | 0.3 | 0.3 | 0.3 |
| Generated heat temperature of the capacitor element (Maximum raised temperature) (° C.) |  | 68.7 | 68.7 | 68.9 | 68.7 | 68.7 | 68.8 | 73.2 |

TABLE 5

|  |  | Ex. 25 | Ex. 26 | Ex. 27 | Ex. 28 | Ex. 29 |
|---|---|---|---|---|---|---|
| Insulation film | Type | Aluminum oxide film | Aluminum oxide film | Aluminum oxide film | Aluminum oxide film | Aluminum oxide film |
|  | Thickness (µm) | 5 | 5 | 5 | 5 | 5 |
| Composition of heat conductive material (mass %) | Alumina particle (average particle diameter 2.5 µm) | 80 | — | — | — | — |

TABLE 5-continued

|  |  | Ex. 25 | Ex. 26 | Ex. 27 | Ex. 28 | Ex. 29 |
|---|---|---|---|---|---|---|
|  | Aluminum nitride particle (average particle diameter 1.5 μm) | — | 80 | — | — | — |
|  | Boron nitride particle (average particle diameter 2.0 μm) | — | — | 80 | — | — |
|  | Zinc oxide particle (average particle diameter 2.0 μm) | — | — | — | 90 | — |
|  | Denatured silicone oil | 20 | 20 | 20 | 10 | — |
|  | Silicone oil | — | — | — | — | 20 |
| Heat conduction rate of the heat conductive material (W/m · K) |  | 2.0 | 3.0 | 2.2 | 1.0 | 2.0 |
| Heat generated temperature of the capacitor element (Maximum raised temperature) (° C.) |  | 63.5 | 63.0 | 63.4 | 64.9 | 63.5 |

TABLE 6

|  |  | Ex. 30 | Ex. 31 | Ex. 32 | Ex. 33 | Ex. 34 |
|---|---|---|---|---|---|---|
| Insulation film | Type | Aluminum nitride film | Aluminum nitride film | Aluminum nitride film | Aluminum nitride film | Aluminum nitride film |
|  | Thickness (μm) | 3 | 3 | 3 | 3 | 3 |
| Composition of heat conductive material (mass %) | Alumina particle (average particle diameter 2.5 μm) | 80 | — | — | — | 80 |
|  | Aluminum nitride particle (average particle diameter 1.5 μm) | — | 80 | — | — | — |
|  | Boron nitride particle (average particle diameter 2.0 μm) | — | — | 80 | — | — |
|  | Zinc oxide particle (average particle diameter 2.0 μm) | — | — | — | 90 | — |
|  | Denatured silicone oil | 20 | 20 | 20 | 10 | — |
|  | Silicone oil | — | — | — | — | 20 |
| Heat conduction rate of the heat conductive material (W/m · K) |  | 2.0 | 3.0 | 2.2 | 1.0 | 2.0 |
| Heat generated temperature of the capacitor element (Maximum raised temperature) (° C.) |  | 63.5 | 63.0 | 63.4 | 63.9 | 63.5 |

TABLE 7

|  |  | Ex. 35 | Ex. 36 | Ex. 37 | Ex. 38 | Ex. 39 | Ex. 40 | Ex. 41 |
|---|---|---|---|---|---|---|---|---|
| Insulation film | Type | Aluminum oxide film | Aluminum oxide film | Aluminum oxide film | Aluminum oxide film | Aluminum oxide film | Aluminum oxide film | Aluminum oxide file |
|  | Thickness (μm) | 5 | 5 | 5 | 5 | 5 | 5 | 5 |
| Composition of heat conductive material (mass %) | Alumina particle (average particle diameter 2.5 μm) | 80 | 70 | 90 | — | — | — | 80 |
|  | Aluminum nitride particle (average particle diameter 1.5 μm) | — | — | — | 80 | — | — | — |
|  | Boron nitride particle (average particle diameter 2.0 μm) | — | — | — | — | 80 | — | — |

TABLE 7-continued

|  |  | Ex. 35 | Ex. 36 | Ex. 37 | Ex. 38 | Ex. 39 | Ex. 40 | Ex. 41 |
|---|---|---|---|---|---|---|---|---|
|  | Zinc oxide particle (average particle diameter 2.0 μm) | — | — | — | — | — | 80 | — |
|  | Polypropylene | 20 | 30 | 10 | 20 | 20 | 20 | — |
|  | Polyethylene | — | — | — | — | — | — | 20 |
| Heat conduction rate of the heat conductive material (W/m·K) |  | 1.9 | 1.4 | 2.4 | 1.6 | 2.1 | 1.0 | 1.9 |
| Heat generated temperature of the capacitor element (Maximum raised temperature) (° C.) |  | 63.6 | 64.0 | 63.3 | 63.8 | 63.4 | 65.2 | 63.6 |

TABLE 8

|  |  | Ex. 42 | Ex. 43 | Ex. 44 | Ex. 45 | Ex. 46 | Ex. 47 | Ex. 48 |
|---|---|---|---|---|---|---|---|---|
| Insulation film | Type | Aluminum nitride film | Aluminum nitride film | Aluminum nitride film | Aluminum nitride film | Aluminum nitride film | Aluminum nitride film | Aluminum nitride film |
|  | Thickness (μm) | 3 | 3 | 3 | 3 | 3 | 3 | 3 |
| Composition of heat conductive material (mass %) | Alumina particle (average particle diameter 2.5 μm) | 80 | 70 | 90 | — | — | — | 80 |
|  | Aluminum nitride particle (average particle diameter 1.5 μm) | — | — | — | 80 | — | — | — |
|  | Boron nitride particle (average particle diameter 2.0 μm) | — | — | — | — | 80 | — | — |
|  | Zinc oxide particle (average particle diameter 2.0 μm) | — | — | — | — | — | 80 | — |
|  | Polypropylene | 20 | 30 | 10 | 20 | 20 | 20 | — |
|  | Polyethylene | — | — | — | — | — | — | 20 |
| Heat conduction rate of the heat conductive material (W/m·K) |  | 1.9 | 1.4 | 2.4 | 1.6 | 2.1 | 1.0 | 1.9 |
| Heat generated temperature of the capacitor element (Maximum raised temperature) (° C.) |  | 63.6 | 64.0 | 63.3 | 63.8 | 63.4 | 65.2 | 63.6 |

As will be apparent from Tables 4 to 8, the electrolytic capacitors of Examples 19 to 48 according to the present invention were excellent in heat dissipation property, and the temperature rise due to the heat generation of the capacitor element was effectively suppressed. In the electrolytic capacitors of Comparative Examples 25 to 48 in which a heat conductive material having heat conductivity of 1 W/m·K or more, the temperature rise due to the heat generation of the capacitor element was more effectively suppressed. To the contrary, in the electrolytic capacitor of Comparative Example 3, the heat dissipation property was insufficient, and the temperature rise due to the heat generation of the capacitor element was large.

INDUSTRIAL APPLICABILITY

The electrolytic capacitor according to the present invention is excellent in heat dissipation property and long in useful time longevity, and therefore it can be preferably utilized in electronics devices for example.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

I claim:

1. A capacitor, comprising:
an external casing made of aluminum; and
a capacitor element enclosed in the external casing,
wherein an external peripheral surface of the external casing is covered with an insulation film, wherein the insulation film is an aluminum nitride film.

2. A capacitor, comprising:
an external casing made of aluminum; and
a capacitor element enclosed in the external casing,
wherein an external peripheral surface of the external casing is covered with an aluminum nitride film formed by a surface nitriding treatment.

3. The capacitor as recited in claim 2, wherein a thickness of the film is 1 to 20 μm.

4. The capacitor as recited in claim 2, further comprising a heat conductive material having heat conductivity of 1 W/m·K or more disposed between the external casing and the capacitor element so as to be in contact with the external casing and the capacitor element.

5. The capacitor as recited in claim 4, wherein the heat conductive material having heat conductivity of 1 W/m·K or more is a heat conductive material in which one or more kinds of particles selected from the group consisting of an alumina particle, an aluminum nitride particle, a boron nitride particle and a zinc oxide particle are dispersed in a matrix material.

6. The capacitor as recited in claim 5, wherein an average particle diameter of the particle is 0.5 to 5 μm.

7. The capacitor as recited in claim 5, wherein a content rate of the particle in the heat conductive material is 70 mass % or more.

8. The capacitor as recited in claim 5, wherein the matrix material is made of silicone oil and/or denatured silicone oil.

9. The capacitor as recited in claim 5, wherein a synthetic resin is used as the matrix material.

10. The capacitor as recited in claim 9, wherein the synthetic resin is polyolefin.

11. The electrolytic capacitor as recited in claim 10, wherein the polyolefin is polypropylene and/or polyethylene.

12. The capacitor as recited in claim 4, wherein the heat conductive material having heat conductivity of 1 W/m·K or more is a heat-conductive material in which alumina particles are dispersed in a matrix material.

13. The electrolytic capacitor as recited in claim 4, wherein the heat conductive material is in contact with the capacitor element by 30% or more of a height of the capacitor element.

14. The electrolytic capacitor as recited in claim 2, wherein the electrolytic capacitor is an aluminum electrolytic capacitor.

15. The electrolytic capacitor as recited in claim 2, wherein the capacitor element includes an anode foil, a cathode foil and a separator disposed between the anode foil and the cathode foil.

* * * * *

UNITED STATES PATENT AND TRADEMARK OFFICE
CERTIFICATE OF CORRECTION

PATENT NO. : 7,495,888 B2  Page 1 of 1
APPLICATION NO. : 10/577324
DATED : February 24, 2009
INVENTOR(S) : Take It is certified that error appears in the above-identified patent and that said Letters Patent is hereby corrected as shown below:

On the title page, Item (87), PCT Publication date information is incorrect. Item (87) should read:

--(87) PCT Pub No.: WO2005/041226
       PCT Pub. Date: May 6, 2005--

Signed and Sealed this

Sixteenth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,495,888 B2
APPLICATION NO. : 10/577324
DATED : February 24, 2009
INVENTOR(S) : Koichiro Take It is certified that error appears in the above-identified patent and that said Letters Patent is hereby corrected as shown below:

Title page, title (Item 54), change, "Electrolytic Capacitor" to --Capacitor--.

Column 28, line 21, change, "electrolytic capacitor" to --capacitor--,
                line 27, change, "electrolytic capacitor" to --capacitor--,
                line 30, change, "electrolytic capacitor" to --capacitor--,
                line 31, change, "electrolytic capacitor" to --capacitor--,
                lines 31-32, change, "aluminum electrolytic capacitor" to
                              --electrolytic capacitor--,
                line 33, change, "electrolytic capacitor" to --capacitor--.

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,495,888 B2
APPLICATION NO. : 10/577324
DATED : February 24, 2009
INVENTOR(S) : Koichiro Take It is certified that error appears in the above-identified patent and that said Letters Patent is hereby corrected as shown below:

Title page, title (Item 54) and Column 1, line 1, change, "Electrolytic Capacitor" to --Capacitor--.

Column 28, line 21, change, "electrolytic capacitor" to --capacitor--,
line 27, change, "electrolytic capacitor" to --capacitor--,
line 30, change, "electrolytic capacitor" to --capacitor--,
line 31, change, "electrolytic capacitor" to --capacitor--,
lines 31-32, change, "aluminum electrolytic capacitor" to --electrolytic capacitor--,
line 33, change, "electrolytic capacitor" to --capacitor--.

This certificate supersedes the Certificate of Correction issued June 30, 2009.

Signed and Sealed this

Twenty-eighth Day of July, 2009

JOHN DOLL
*Acting Director of the United States Patent and Trademark Office*